Figure 1:
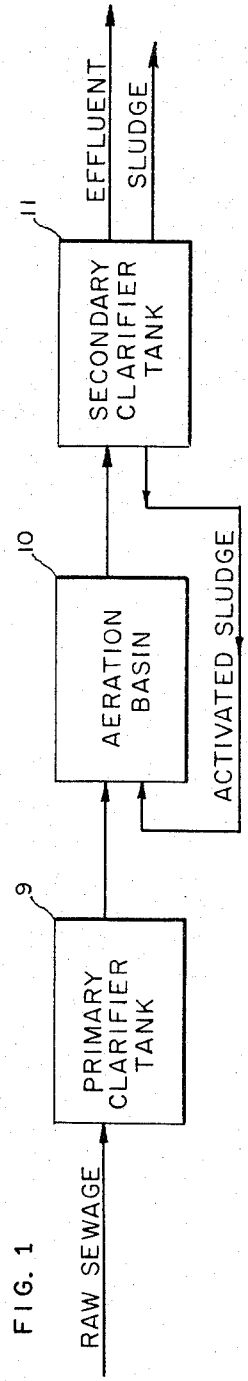

Sept. 19, 1967  V. A. BRINGLE  3,342,727

METHOD OF AND SYSTEM FOR SEWAGE TREATMENT

Filed Dec. 6, 1965  2 Sheets-Sheet 1

VICTOR A. BRINGLE
INVENTOR
BY
BUCKHORN, BLORE, KLARQUIST & SPARKMAN
ATTORNEYS

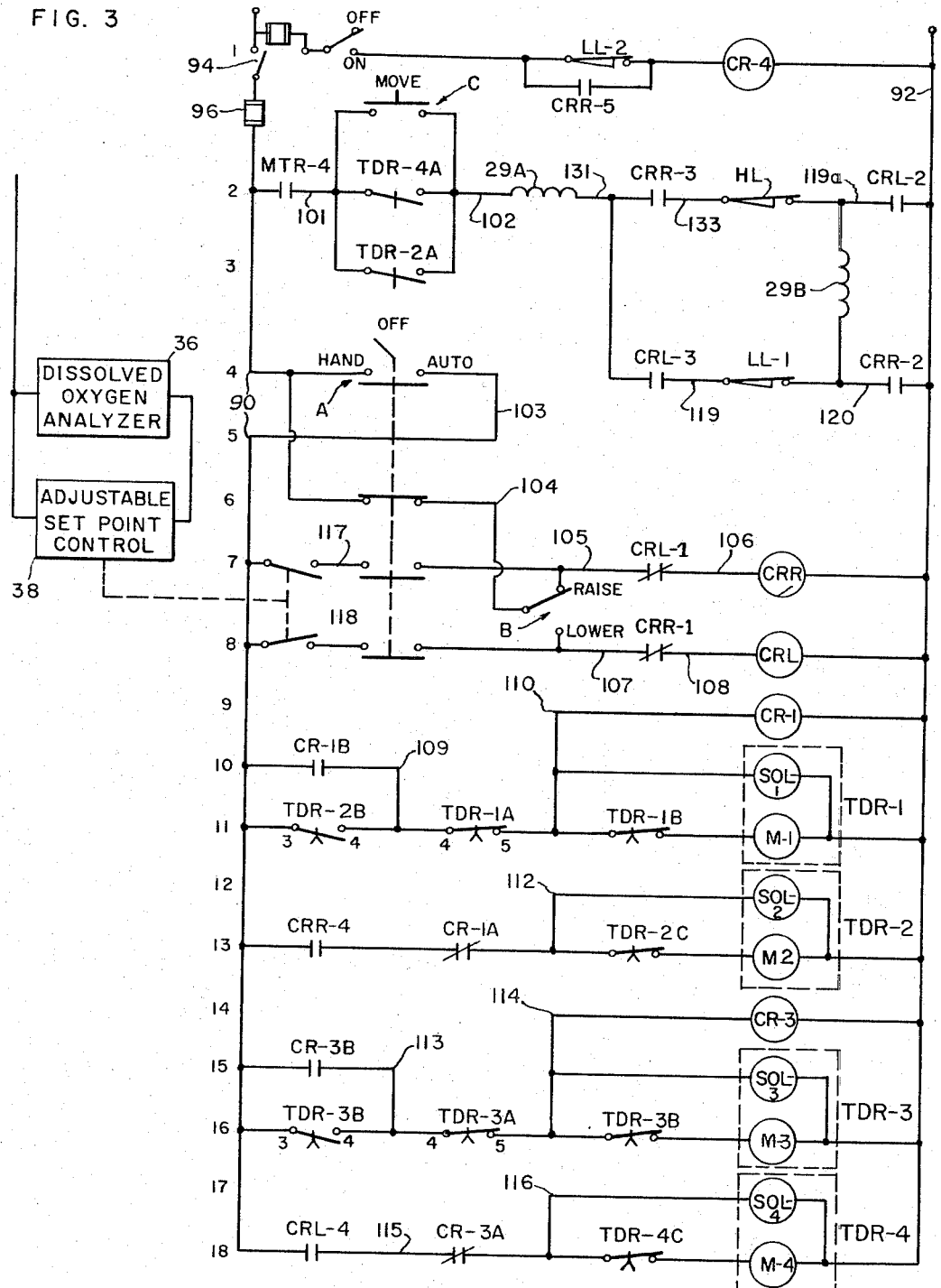

United States Patent Office 3,342,727
Patented Sept. 19, 1967

3,342,727
METHOD OF AND SYSTEM FOR SEWAGE TREATMENT
Victor A. Bringle, 107 SE. 2nd Ave., Hillsboro, Oreg. 97123
Filed Dec. 6, 1965, Ser. No. 511,673
2 Claims. (Cl. 210—15)

This invention relates to an activated sludge process of treating sewage and, more particularly, to a process in which the dissolved oxygen content of the sewage during aeration thereof is maintained at a constant level and to apparatus for performing such process.

In the activated sludge process of treating sewage, the effluent from a primary clarifier tank is generally passed through a treatment tank, known as an aeration tank or basin, and therein subjected to oxygenation by agitating the same in the presence of air. The organic materials in the sewage are decomposed aerobically by bacteria contained in a biologically active floc.

When sewage is agitated in the presence of oxygen, a sludge floc is formed from the sewage particles. Millions of bacteria and other small living organisms develop on this sludge floc. The sludge floc itself becomes active in the absorbing and oxidizing of the organic matter contained in the sewage. Hence, the sludge is called "activated sludge." When the sludge is in good condition, it and its load of microscopic life can settle rapidly and take with it nearly all the suspended solids in the sewage, and much of the solids in the colloidal state. The sludge floc is maintained by returning into the sewage a portion of the sludge from the end of the process. The combined sewage and returned sludge, called "mixed liquor," flows into an aeration tank or basin in which the aerobic decomposition takes place. The mixture is agitated and mixed with air, during which time the flocculation, absorption and oxidation of the suspended and colloidal organic matter, and some of the matter in solution, takes place. The mixture of sewage and sludge passes from the aeration basin into a final settling tank where the activated sludge floc settles out. The effluent remaining is a relatively clear liquid with very little organic matter therein.

It is an object of the present invention to provide a process wherein the efficiency of the biological reaction in the aeration basin is maximized.

More particularly, it is an object of the present invention to provide an improved activated sludge process capable of operating at high levels of bio-chemical oxygen demand (B.O.D.).

Still another object is to separate the mixing and aeration functions holding mixing as an independent variable and aeration as a dependent variable.

Another object is to provide an improved activated sludge process that has minimum sensitivity to changes in the characteristics of the sewage being treated and which recovers effectiveness rapidly after wide fluctuations in sewage characteristics.

Still another object is to provide environmental control to limit development of undesirable forms of bacterial growth within the activated sludge.

Still another object is to provide new and improved apparatus for controlling an activated sludge process.

A further object of the present invention is to provide a new and improved arrangement for controlling the amount of residual oxygen in the activated sludge slurry.

These and other objects and advantages of the invention will become more apparent hereinafter.

In accordance with the foregoing objects, I have discovered that a highly efficient activated sludge process is achieved by introducing air into the mixed liquor in amounts sufficient to maintain the residual oxygen at a constant level of between about 1 and 3 parts per million, the liquor being agitated mechanically so as to maintain substantially uniform distribution of the oxygen. I accomplish this by continually measuring or monitoring the residual oxygen in the mixed liquor with an instantaneous oxygen analyzer from which a signal proportional to the oxygen content can be derived and utilizing such signal to control the introduction of air into the liquor so as to maintain such oxygen level.

Figure 2:
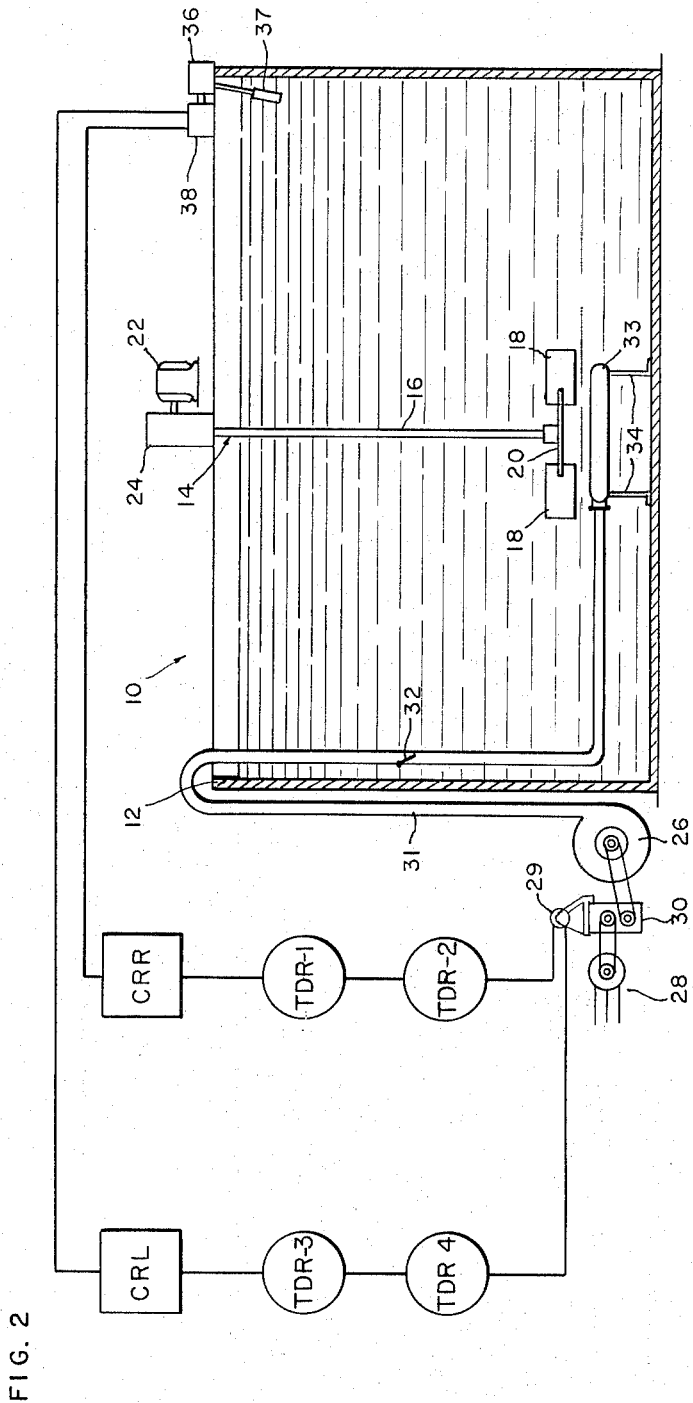

This invention will more fully understood by referring to the drawings and to the following description. In the drawings, FIG. 1 is a schematic diagram showing the process of my invention;

FIG. 2 is a cross-sectional view through the aeration tank with the electrical controls indicated schematically; and FIG. 3 is an across-the-line diagram of a suitable electrical control circuit for use with the invention.

Referring to the drawings, FIG. 1 is a schematic diagram of my improved activated sludge process. Raw sewage is introduced into a primary clarifier tank 9, which has the usual scum baffle and skimmer (not shown). The effluent from the primary clarifier tank is then passed into an aeration basin 10, which will be more fully described below. Activated sludge from the end of the process is also introduced into the aeration basin, and this forms the usual mixed liquor of the activated sludge process. After the mixed liquor has been agitated in the presence of air for a period of time sufficient to permit the biologically active sludge floc to effect adsorption and some absorption of the organic matter in the liquor, the effluent is passed into a secondary clarifier tank 11. Here the sludge settles out, leaving a relatively clear effluent which can be discharged into a waterway or further used or treated, as desired. Some of the sludge is recirculated to the aeration basin 10 and the excess removed for suitable disposal.

The aeration basin 10 of the present invention, shown in more detail in FIG. 2, comprises a tank 12 for holding the effluent from the primary clarifier tank and the activated sludge. Centrally located within the tank 12 is an agitator 14, including a shaft 16 and impeller blades 18 attached thereto by arms 20. The agitator 14 is driven by a motor 22 which is connected to the shaft 16 through a suitable drive box 24. Air is supplied to the center of the aeration basin 10 by means of a blower 26, driven by a constant speed motor 28 connected to the blower 26 through a variable drive mechanism 30, such as the type sold under the trademark "Varidrive." The drive mechanism 30 is adjusted to vary the speed of the blower 26 by means of a reversible electrical control motor 29 controlled in a manner to be more fully described hereinafter. The air is blown into a conduit 31, through a check valve 32, and into a sparge ring 33, which is mounted on supports 34 at the bottom of the tank 12.

Attached to the upper portion of the tank 12 at one side thereof is a dissolved oxygen analyzer 36 having a dissolved oxygen sensor 37 which is placed inside of the tank 12 and is capable of detecting the amount of dissolved oxygen in solution. The dissolved oxygen analyzer 36 is capable of continually and instantaneously measuring the dissolved oxygen in the mixed liquor and of providing a signal in response thereto. A suitable instrument is one manufactured by Beckman Instruments, Inc., and known as its Model 778, which operates on the polarographic principle. The analyzer 36 is connected to a set point control unit 38, which has adjustable High and Low set points. The indicating meter in the control unit 38 is coupled with the indicating meter in the analyzer 36 to receive the same signal.

The set point control unit 38 is so adjusted that as long as the dissolved oxygen content in the mixed liquor remains between about 1½ and 2½ parts per million, a null point exists and no change occurs in the speed of the blower 26. If the dissolved oxygen content drops below 1½ parts per million, which is the Low set point, a set of electrical contacts is closed, thereby completing a control circuit to effect a change in the drive mechanism 30, thereby to increase the speed of the blower 26 by a predetermined amount and increase the amount of air applied to the solution.

If the dissolved oxygen content exceeds 2½ parts per million, which is the High set point, a second set of electrical contacts is closed, thereby completing a control circuit which effects a decrease in the speed of the blower 26 by a predetermined amount and, hence, a decrease in the amount of air applied to the solution. In each case, the blower speed is desirably maintained for a short period of time, for example, 2 minutes. If at the end of this time the dissolved oxygen content is still not within the desired range, there is a further incremental increase or decrease in the speed of the blower 26, as required. In this manner the residual or dissolved oxygen content of the mixed liquor is maintained at a constant level of between about 1 and 3 parts per million.

Referring to FIG. 2, the set point control unit 38 is adapted to effect operation of two control relays CRR and CRL. The control relay CRR, upon receiving a call for increased oxygen, closes, thereby furnishing power to two time delay relays TDR–2 and TDR–1, which time the period power is applied to the drive mechanism control motor 29 and the period between such power applications, respectively. When the control relay CRR is energized, the windings in the control motor 29 are so arranged to provide correct rotational direction of the control motor 29, thereby to cause adjustment of the drive mechanism to increase the speed of the blower 26 and, accordingly, increase the rate of air supply to the mixed liquor in the tank 12.

The control relay CRL, upon receiving a call for decreased oxygen content, closes, thereby furnishing power to two time delay relays TDR–4 and TDR–3, which time the period power is applied to the drive mechanism control motor 29 and the period between such applications, respectively. When the control relay CRL is energized, the windings in the control motor 29 are so arranged to provide correct rotational direction of the control motor 29 to cause adjustment of the drive mechanism to decrease the speed of the blower 26 and, accordingly, decrease the rate air is supplied to the mixed liquor in the tank 12.

The time delay relay TDR–1 is capable of timing the period between the incremental increases in the speed of the blower 26. The time delay relay TDR–2 is capable of timing the duration of operation of the control motor 29, thereby to effectuate the desired incremental increases in the speed of the blower 26. The time delay relay TDR–3 is capable of timing the period between the power applications that decrease the speed of the blower 26. The time delay relay TDR–4 is capable of timing the duration of operation of the motor 29 when a decrease in air is called for, thereby to effectuate the desired decreases in the speed of the blower 26.

A feature of the system is that if the biological food supply is withdrawn completely, as would happen over a weekend in an industrial waste sewage system, and consequently the oxygen level increases to above 2½ parts per million, the blower 26 is slowed down by stages until a predetermined blower speed is reached, at which speed the power to the motor 28 is cut off. Shut down of the motor 28 occurs when the oxygen requirements of the mixed liquor cause the blower 26 to operate at a speed less than the minimum speed required for proper cooling of the blower 26. The blower motor 28 starts up again when the dissolved oxygen content of the mixed liquor falls below the Low set point. Thus, the blower 26 cycles on and off to match the oxygen requirements of the mixed liquor, if the conditions under which the plant is operating make this desirable.

FIG. 3 illustrates in an across-the-line diagram a control circuit suitable for achieving the operation above discussed. The circuit is connected between power conductors 90, 92, which may be provided with a master switch 94 and an overload protective device 96. The circuit is adapted for manual or automatic operation as desired; the former operation will be first described.

When ganged switch A (lines 4—8 of the diagram) is in the Hand or manual position, as shown, a circuit is closed between conductors 90, 92 through wire 104 and a manually operated switch B, which may be operated either to raise or lower the speed of the blower 26. When switch B is in the Raise position, a control relay CRR is energized through a normally-closed contact CRL–1 (between wires 105 and 106) of control relay CRL, which contact is opened only by energization of control relay CRL. The normally closed contact is incorporated in the system as an interlock, so that both control relays CRL and CRR cannot be simultaneously actuated.

When control relay CRR is energized, is closes a contact CRR–3 between wires 131 and 133 and a contact CR–2 between wire 120 and conductor 92, thus completing a circuit from the Move button (switch C) through a winding 29A of motor 29, contact CRR–3, a high limit switch HL, winding 29B of motor 29, contact CRR–2 and conductor 92. Connected between the Move button (switch C) and conductor 90 is a contact MRT–4 adapted to close upon energization of the motor 28. Assuming the motor 28 is operating, if the move button (switch C) is closed, the control motor 29 will be driven to adjust the drive mechanism 30 such that the speed of the blower 26 increases. When the maximum speed desired is attained, the high limit switch HL is operated by suitable cams in the drive mechanism so as to open, breaking the circuit.

When switch B is in the lower position, a control relay CRL is energized through a normally-closed contact CRR–1 (between wires 107 and 108) of control relay CRR, which contact is opened only by energization of control relay CRR. The normally closed contact CRR–1 is also part of the interlock incorporated in the system to prevent both control relays CRL and CRR from being simultaneously actuated.

When the control relay CRL is energized, it closes a contact CRL–3 between wires 131 and 119 and a contact CRL–2 between wire 119a and the conductor 92, thus completing a circuit from the Move button (switch C) through the winding 29A of the motor 29, contact CRL–3, a low limit switch LL–1, winding 29B of motor 29, contact CRL–2 and the conductor 92. Thus, assuming the motor 28 is operating so that the contact MRT–4 is closed, as long as the switch B remains in the Lower position and the Move buttton (switch C) is closed, the control motor 29 will be driven to adjust the drive mechanism 30 to lower the speed of the blower 26. When the control motor 29 has decreased the speed of the blower 26 such that the minimum speed desired is obtained, the low limit switch LL–1 is operated, thereby to open and to break the circuit through the control motor 29.

When the ganged switch A is placed in the automatic position, a circuit is closed between the conductor 90 and a wire 103, the circuit being broken through wire 104. The ganged switch A also closes the contacts between wires 105 and 117, and wires 107 and 118, such that the wires 117 and 118 on lines 7 and 8 of the diagram, respectively are capable of receiving the automatic raise and lower signals from the set point control unit 38, as shown.

As long as the dissolved oxygen content in the mixed liquor remains within 1½ and 2½ parts per million, the set point control unit 38 does not emit either a Raise or a Lower signal, and the contacts to wires 117 and 118 remain open. If the dissolved oxygen content drops below 1½ parts per million, however, a raise signal is emitted by the set point control unit 38, and the contact wire 117 is closed. Similarly, if the dissolved oxygen content is above 2½ parts per million, a decrease in dissolved oxygen is called for, and the contact to wire 118 is closed. The same circuits through the speed control motor 29 are then affected, as in the case of manual operation, above described.

Closing the contact to wire 117 when the raise signal is emitted energizes control relay CRR, as above described. However, inasmuch as the move button at switch C is not operated under automatic operation, the circuit between the winding 29A of the motor 29 and the contact MTR-4 must close through either time delay relay TDR-2 or time delay relay TDR-4.

Energizing control relay CRR closes a contact CRR-4 in line 13 of the diagram and energizes time delay relay TDR-2, through a normally-closed contact CR-1A of a relay CR-1, starting motor M-2 thereof and causing energization of solenoid SOL-2 of the relay clutch. The time delay relay TDR-2 is set to cause operation of the control motor 29 for a period of time which will effect the desired incremental increase in the speed of the blower 26, as follows. Energizing the time delay relay TDR-2 causes immediate closure of contacts TDR-2A thereof, completing the circuit through windings 29A and 29B of the speed control motor 29, as shown in line 3 of the diagram. Contacts TDR-2A remain closed for a predetermined period of time, for example 0.7 second, and then open. At the same time contacts TDR-2C open stopping the timer motor M-2. Thus, the control motor 29 runs for the predetermined length of time for which timer TDR-2 is set, thereby to increase the speed of the blower 26 by the desired amount and to increase the amount of oxygen introduced into the solution. For a 132 cubic foot per minute blower, a desirable incremental increase would be 100 r.p.m.

Combined with the time delay relay TDR-2 is another time delay relay TDR-1, which creates an interval between the incremental increases in the speed of the blower 26. The circuitry for this operation is shown in lines 9–11 of the diagram. At the same time as contacts TDR-2A open, contacts TDR-2B between points 3 and 4 in line 11 of the diagram close, to close the circuit through the time delay relay TDR-1. The circuit through relay CR-1 is also closed; energization of the relay CR-1 causes its contacts CR-1A to open the circuit through timer TDR-2. Thereafter TDR-2C contacts reclose to condition timer TDR-2 for its next cycle. Energization of relay CR-1 also closes contacts CR-1B thereof, closing a circuit around contacts TDR-2B, which open immediately after their closure.

At the conclusion of the interval for which the timer TDR-1 is set, and which is preferably about two minutes, both of its contacts TDR-1A and TDR-1B open momentarily. The relay CR-1 is thus de-energized, permitting contacts CR-1A to reclose, which restores the circuit on line 13 of the diagram, thereby reconditioning the circuit through timer TDR-2 should the control relay CRR be subsequently re-energized by another raise signal. Contacts CR-1B also open at this time.

Thus, after the speed of the blower has been increased by the incremental amount, there is an enforced delay to give the increased air time to take effect. This delay is set at 2 minutes, as above described. If the raise signal still remains at the end of the 2-minute waiting period, the cycle repeats itself; otherwise if the set point control unit 38 is at the null point, the system remains stabilized until a further signal is received.

When the set point control unit 38 emits a lower signal to wire 118, the control relay CRL is energized, thereby energizing the time delay relay TDR-4. Timer TDR-4 is the counter-part of timer TDR-2 in the raise circuit, and it and its associated circuit operate in a manner similar to the timer TDR-2 to cause the control motor 29 to operate for a period of 0.7 second to decrease the rate at which air is introduced to the aeration basin 12. Timer TDR-3 is the timer that determines the interval between the lowering steps, and its circuit is shown on lines 14–16 of the diagram and is identical to the circuit for timer TDR-1 on lines 9–11 of the diagram. The raise and lower circuits whether they are manual or automatic, are thus seen to be mirror images of each other.

When the minimum desired speed for the blower 26 is attained, that is, an excess of oxygen is present, means are provided to stop motor 28. The illustrated means comprises a low limit switch LL-2, adapted to be opened by a suitable cam in the drive mechanism 30 when it is adjusted to drive the blower at the aforementioned minimum desired speed. Opening of switch LL-2 opens a circuit through the coil of a relay CR-4, which upon de-energization is adapted to open the circuit (not shown) to the motor 28 in conventional manner. Contacts CRR-5 of relay CRR are placed in parallel with switch LL-2, so that upon call for oxygen such contacts close the circuit through relay CR-4, to cause motor 28 to restart. The drive mechanism 30 will then readjust to permit switch LL-2 to reclose.

An industrial waste sewage system according to the present invention was installed to treat the effluent from a pet food plant which is very heavy with animal tissue. The bio-chemical oxygen demand (B.O.D.) of the effluent of this plant varies from 0 part per million in the aeration basin to 2000 parts per million. The effluent is further characterized by having a high degree of variability in the actual hydraulic flow into the treatment plant. The suspended solids ratio of the mixed liquor at times reaches 8000 parts per million. Prior to placing the control system of the present invention in operation, this extreme variability made it impossible to maintain any biologically active floc in the aeration basin at all. After the installation of the present system, it was possible to maintain a good, healthy floc which would achieve better than a 90 percent reduction in the B.O.D. of the input.

In the foregoing description, the invention has been described with reference to a certain particular preferred embodiment, though it is to be understood that the specific details shown are merely illustrative and that the invention may be carried out in other ways without departing from the true spirit and scope of the appended claims.

I claim:
1. In an activated sludge process for treating sewage wherein air is introduced to said sewage at a rate sufficient to maintain the dissolved oxygen content therein between predetermined minimum and maximum limits to effect aerobic decomposition thereof, the improvement comprising the steps of:
   continually measuring the dissolved oxygen content of said sewage,
   feeding air to said sewage at a predetermined rate as long as said dissolved oxygen content remains within said predetermined limits,
   when said dissolved oxygen content exceeds said maximum limit decreasing the rate of air introduction stepwise by predetermined amounts at predetermined intervals until said dissolved oxygen content decreases to below said maximum limit,
   when said dissolved oxygen content falls below said minimum limit increasing the rate of air introduction stepwise by predetermined amounts at predetermined intervals until said dissolved oxygen content increases to above said minimum limit.
2. In an activated sludge sewage treatment plant,
   a basin for retaining sewage to be treated,
   means for introducing air into said tank to effect aerobic decomposition of said sewage including a pump and a motor for driving said pump,
   means for continually measuring the dissolved oxygen content of said sewage and for providing a first signal when said dissolved oxygen content exceeds a predetermined limit and providing a second signal when said dissolved oxygen content falls below a predetermined limit, control means responsive to said signal for controlling said pump motor and for reducing the speed of said pump motor and thus said pump stepwise by predetermined amounts at predetermined intervals upon reception of said first signal from said measuring means and for increasing the speed of said motor and thus said pump stepwise by predetermined amounts at predetermined intervals upon reception of a second signal from said measuring means, whereby the dissolved oxygen content of said sewage in said basin may be maintained substantially between said predetermined minimum and maximum levels.

References Cited

Babbit, H. E.: Sewerage and Sewage Treatment, sixth edition, 1947, John Wiley and Sons, New York, pp. 454, and 460–466 relied on (copy in Group 171).

Stracke, G.: Continuous Measurement of Oxygen To Control and Regulate Aeration, Water Sewage Works, October 1960, vol. 107, pp. 388–390 (Gp.171).

Mechanicomb, Journal WPCF, February 1962, page 77a (POSL).

JOSEPH SCOVRONEK, *Acting Primary Examiner.*

MICHAEL E. ROGERS, *Assistant Examiner.*